Feb. 7, 1933.  C. H. SPARKLIN  1,896,429
CONDENSATION METER
Filed May 16, 1929  3 Sheets-Sheet 2
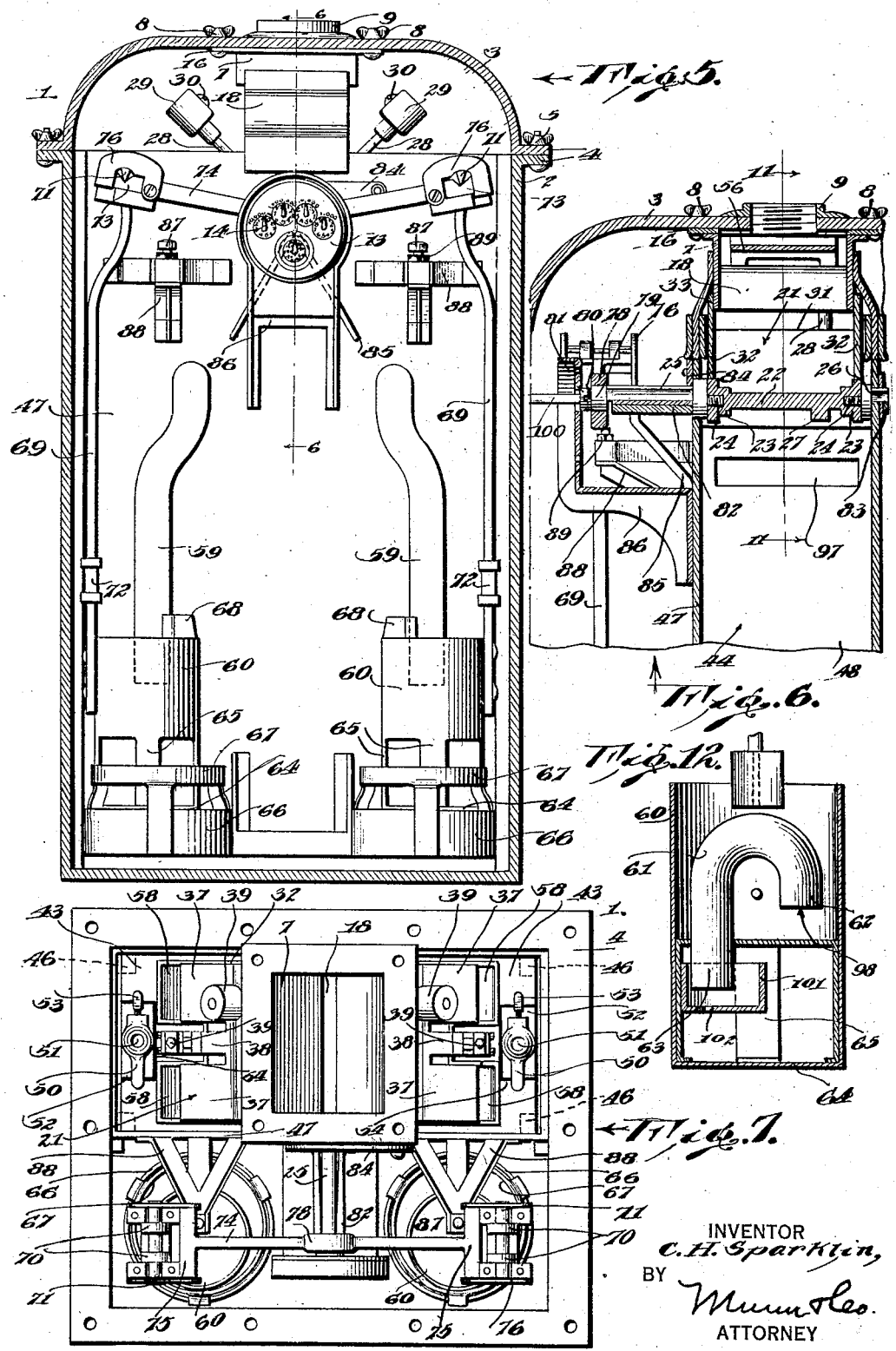
INVENTOR
C. H. Sparklin,
BY
Munn & Co.
ATTORNEY

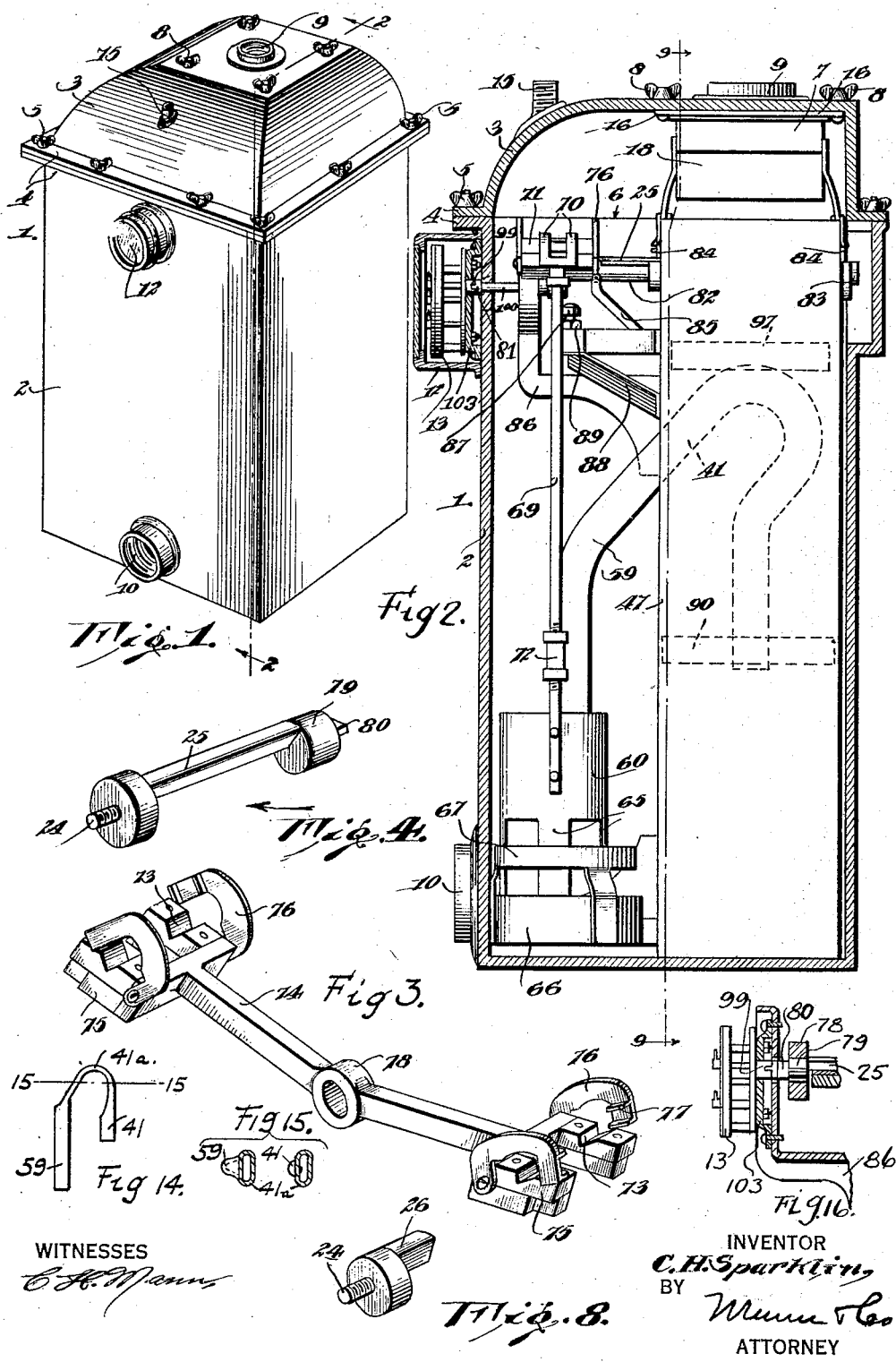

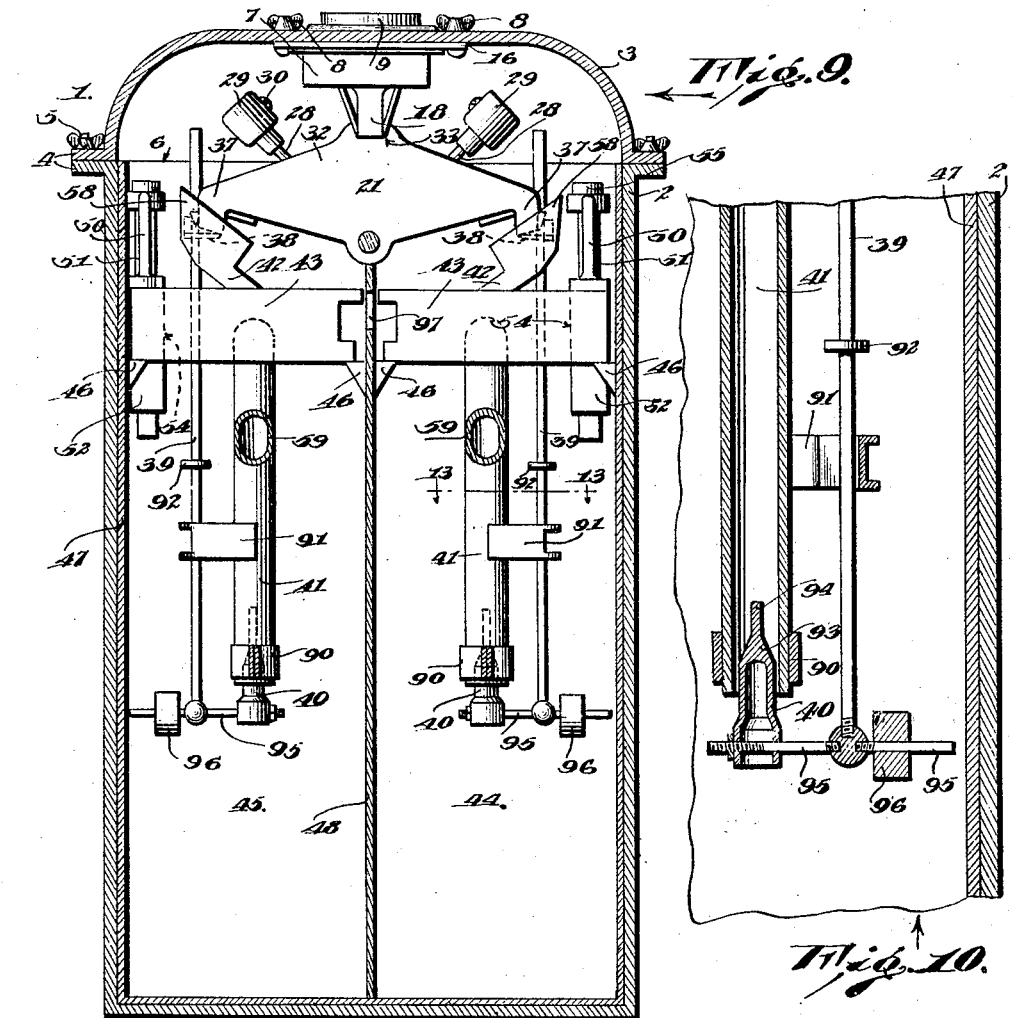

Patented Feb. 7, 1933

1,896,429

UNITED STATES PATENT OFFICE

CHARLES HAROLD SPARKLIN, OF TOPEKA, KANSAS

CONDENSATION METER

Application filed May 16, 1929. Serial No. 363,691.

This invention relates to improvements in meters or liquid measuring apparatus, and it consists of the constructions, combinations and arrangements herein described and claimed.

An object of the invention is to provide a meter for the measurement of condensate such as would occur in places using steam from a district heating plant or the like, or for use at any place where it is desired to measure flows of liquids other than condensate not under pressure.

Another object of the invention is to provide a meter of either the specific or general type above indicated, which possesses the important and necessary attribute of separability, that is to say, a meter which can be taken apart completely and cleaned in all of its recesses without spoiling any adjustment to cause an incorrect operation upon the subsequent reassembly.

Another object of the invention is to provide a meter of the character described which has the novel capacity of being capable of subjection to operation and testing when removed from its metal casing, thus making possible an observation of the functioning of each and every part.

A further object of the invention is to provide a meter of the character described which has a comparatively large capacity per unit weight, that is to say, a meter which is small when compared with the weight of the duty which it is capable of performing.

Other objects and advantages appear in the following specification, reference being had to the accompanying drawings in which Figure 1 is a perspective view of the improved condensation meter, this view being an illustration of the outside metal casing in particular, Figure 2 is a vertical section taken on the line 2—2 of Figure 1, Figure 3 is a perspective view of the rocker lever from which certain buckets are suspended, Figure 4 is a perspective view of the long knife-edge bearing to one end of which the foregoing rocker lever is attachable, Figure 5 is a view of the meter showing the casing in section and the so-called inner element in elevation, Figure 6 is a detail cross section taken on the line 6—6 of Figure 5, Figure 7 is a plan view of the meter, the cover being removed, Figure 8 is a perspective view of the short knife-edge bearing later described in connection with a certain priming pan, Figure 9 is a vertical section taken substantially on the line 9—9 of Figure 2, Figure 10 is a detail sectional view of a feature of Figure 9, particularly illustrating one of the siphon restrictors, Figure 11 is a detail cross section taken on the line 11—11 of Figure 6, Figure 12 is a section of one of the buckets, Figure 13 is a section taken on the line 13—13 of Fig. 9 showing one of the rod supports, Figure 14 illustrates a modification wherein a portion of the siphon tube is flattened, Figure 15 is a cross section on the line 15—15 of Figure 14, Figure 16 is a detail view showing how the dial mechanism is mounted on the frame upon the removal of the frame from the casing for testing.

Reference is made to the drawings. The meter is so identified as an entirety and is generally designated 1. It comprises the outside metal casing 2 (Fig. 1) which has a cover 3, the two parts being flanged at 4 and secured with bolts and wing nuts commonly designated 5. By undoing and removing the latter the cover can be taken off so as to expose an inner element 6 for inspection or removal.

The inner element has no connection with the casing excepting at the top where a device known as a nozzle 7 is secured to the cover 3 by wing nuts 8. The inlet and outlet openings of the meter are designated at 9 and 10. The nozzle will come off with the cover 3, and then the inner element 6 would be exposed, as stated before, for the purposes mentioned.

It is possible to take the inner element out, stand it apart from the casing and subject it to operations identical with those that would be performed were it contained by the casing and in its normal state. It is thus possible to watch the operation, see whether the parts are functioning correctly, make any necessary adjustment, clean the elements, etc., all this without deranging any part so that an incorrect operation will not result upon a reassembly.

For the purpose of testing, provision is made for removing the meter dial from its customary position on the outside of the meter and attaching it to the inner element so that the operation can be checked. This provision also includes an encasement for the meter dial so that the working parts of the latter will not be affected by fumes, etc., and that the dial face will always be clear for reading.

A sleeve 12 with a glazed opening reveals the dial 13 and the indicator hands 14 thereof (Figure 5). The sleeve is appropriately mounted on the casing 2 and surrounds the dial mechanism, thus affording a protection therefor. The sleeve will tend to prevent the clouding of the glass.

The arrangement is well shown in Figure 2. 13 and its mechanism are mounted on the outside of the casing 2. A glazed hood 12 covers the dial. The clutch element 99 (Fig. 2) of the dial mechanism and a similar element 80 (Fig. 6) of a driver receive the heads 81 (Figs. 2 and 6) of a link 100. The link has bearing in the casing, and upon removal of the casing for the foregoing testing of the inner element, the dial mechanism would be disconnected and the clutch element 99 would be coupled with the element 80 (Fig. 16). The dial mechanism has a mounting 103 (Fig. 2) of a character that will permit its attachment either to the casing 2, as in Fig. 2 or to a frame 86 in the event of the removal of the casing 2 as in Figure 16.

Describing the parts generally in the order of progression of the liquid from the inlet 9 to the outlet 10, the nozzle 7 is situated immediately below the inlet. The cover 3 is provided with a vent 15. That part of the nozzle next to a flange 16 through which the securing means 8 makes the connection of the nozzle with the cover 3, is shaped like a rectangular box. The outlet 17 of the nozzle is reduced at 18, to restrict the volume of liquid and to center the stream into one or the other of two hoppers 19 and 20 (Fig. 11) of what is herein known as the priming pan 21. Placed in the nozzle 7 is a deflector 56 (Fig. 11) which is for the purpose of diverting steam in case the stream trap (not shown) ahead of the meter blows steam, and allow the liquid to flow into the meter.

The foregoing pan has an integral shaft 22. The ends are enlarged to form hubs 23 (Fig. 6). Into these the threaded spindles 24 of long and short knife-edge bearings 25 and 26 are screwed. The shaft has a boss 27, made for the purpose of receiving the stems 28 of pan unbalance weights 29. The weights will be set at adjustments along the stems by screws 30.

A partition 31 divides the priming pan 21. This runs along the shaft 22 and meets the pan ends 32. Upstanding parts 33 of said ends work closely beside the ends of the reduction 18, obviating the possibility of liquid dashing out of the hoppers 19 and 20. A bottom 34 which slopes upwardly in opposite directions from the shaft 22, and a top 35, together with portions of the ends 32 define ducts 36 and spouts 37. These spouts are made in pairs as shown in Fig. 7, there being seats 38 between the spouts for the purpose of sustaining rods 39 (Fig. 9) which carry restrictors 40. These cooperate with the large siphon tubes 41.

Although the siphon tubes are shown round in cross sectional shape, it is desired to state here that they are subject to variations should it be found desirable to embody the latter. For instance, the tubes may be flattened as at 41ª (Figs. 14 and 15) for the major part of their length leaving the extremities round in cross section. One section would be merged smoothly into the other, and the cross sectional area of the various sections of the tubes would be the same. Illustration of this modification is omitted since it is readily understood from the description.

The purpose of the tops 35 is to confine the liquid to a relatively small cross sectional area and prevent the liquid from building up a variable head on varying flows of liquid over the whole surface of the priming pan. The top 35 of the priming pan follows the line that the liquid in the side of the priming pan in the up position would follow when at rest on zero flow and filled to the over-flowing point. The heads of liquid will be built in the hoppers 19 and 20. There will be pressure heads in the ducts 36, and the volume of water will remain constant.

This ensures that the quantity of water over-flowing into certain measuring buckets, later described, when in the up position necessary to throw the rocking element, will be practically constant under all loads. The head is built up in the hoppers 19 and 20 by adding a minimum volume of water represented by the cross section of the hopper and the depth of water above the top 35. This top 35 holds the weight of the water in most of the priming pan the same at any load.

Liquid flowing through the priming pan 21 is discharged at the spouts 37 into chutes 42. These chutes are made integral with elements 43 herein known as compartment restrictors. These restrictors are of a hollow construction. They are in the nature of covers. They appear like heads at the top of compartments 44 and 45 (Fig. 9) to which end they are supported by an arrangement of rests 46 attached at appropriate places both on the walls of a liquid box 47 and a partition 48 which divides the liquid box into the compartments mentioned.

Although the compartment restrictors are hollow yet they are heavy enough to avoid floating upon the liquid in the compartments. They are held upon the rests 46 by gravity only being made heavy enough to remain in position upon the rests when surrounded by water. In assembling the meter, the restrictors are simply dropped into place. Transversely bowed depressions 49 on the underside of the restrictors 43 receive the bands of the siphon tubes 41. Each restrictor carries a bracket 50 (Figs. 7, 9 and 11) in each of which the tubular or other stem 51 of a displacement plunger 52 is slidable yet capable of being held by a thumb screw 53 (Fig. 7).

The plungers 52 are suitably affixed near the bottoms of the stems 51. They occupy in part chambers 54 in the remote ends of the restrictors 43. The plungers are adjustable up and down in these chambers and in the compartments 44 and 45. They are limited in their downward adjustment by the engagement of collars 55 on the upper ends of the stems with the brackets 50. The purpose of the plungers is merely to cause the meter to register more or less liquid. To this end they constitute a corrective feature. The plungers will be of a known volume, and variations in the registration of the meter can be compensated for as may be required.

The chutes 42 are inclined toward each other (Fig. 11) and terminate in outlets 57 at points adjoining the partition 48. The upper and opposite ends of the chutes are enlarged at 58 in order to provide ample room for the swinging of the spouts 37. The enlargements 58 will occur in pairs (Fig. 7) to agree with the spouts 37, but particularly to accommodate the rods 39. As the liquid flows into the compartments 44 and 45 a column of it will rise in the inner tubes of the large siphons until it reaches the level of the overflowing point of the ends within the depressions 49.

Thence some of the liquid will run into the outer tubes 59 of the siphons (Figs. 2 and 5) discharging into buckets 60 which have been mentioned before. Each of these buckets has a small siphon tube 61 (Fig. 12). This siphon tube is fixed in the bottom of the bucket. The intake end 62 is spaced from the bottom, and the outlet 63 extends a moderate distance below the bottom. A baffle plate 64, suspended from each bucket 60 by straps or other means 65, is intended to strike upon a quantity of liquid in a cup 66 on the bottom of the meter, and absorb the shock which will follow the rocking or shifting in position of the priming pan 21. In this respect the baffle 64 and cup 66 act in the capacity of the plunger and cylinder of a dash-pot.

Guides 67 keep the buckets 60 from swinging outside of the cups 66. Inserts 68 are fitted in the buckets. They prevent the outside bottom of each siphon tube 59 from striking the top of the small siphon in each bucket when the latter rises from a down to an up position. In other words, the inserts 68 prevent the buckets from swinging in under the large siphon tubes to such an extent that the latter would jamb into the top of the small siphons.

The buckets are carried by rods 69 which terminate in yokes 70 at the top in which knife-edges 71 are fixed. The rods 69 actually comprise two parts, the adjoining ends of these being threaded and connected by couplings 72. In addition to this capacity, the couplings may serve as adjusting means for the rods. The buckets 60 may thus be raised or lowered in respect to the rods should that be a requirement.

Seats 73 (Figs. 3 and 5) at the extremities of a rocker lever 74 receive the knife-edges 71. The seats comprise V notches in the bifurcated ends 75 of the rocker lever. Having once hung the buckets 60 in position upon the rocker lever, the knife-edges are prevented from jumping their seats by pivoted clamps 76 which are swung into position. The free ends of these clamps have formations 77 which may be termed grips. These grips will clasp parts of the bifurcations 75 and thus maintain a closed position.

A hub 78 in the center of the lever 74 receives the boss 79 of the long knife-edge bearing 25 (Figs. 4 and 6). The hub is keyed or otherwise set in place. The boss carries the previously mentioned clutch element 80, the other element 81 of which (Fig. 6) is associated with the works of the dial hands 14.

Thus far it will be understood that the priming pan 21 and the rocker lever 74 operate as one. They rock upon bearings 82 and 83 (Fig. 6) upon which the long and short knife-edges 25 and 26 rest. Suitable clamps such as shown at 84 in Fig. 5 hold the knife-edges down upon the bearings. Brackets 85 support the bearing 82. The frame 86 may carry the dial 13 and the registering works.

Screws 87 (Fig. 5) limit the downward motion of the lever 74. In this respect they limit the travel of the priming pan 21. They are carried by brackets 88 which protrude from the liquid box 47. The screws are adjustable upon the brackets, and the adjustments are set by jam nuts 89.

Reverting to the liquid box 47, it is observed in Figs. 2 and 9 that the lower ends of the large siphon tubes 41 are held in braces 90 which extend to the inner walls of the compartments. Supports 91 (Fig. 13) act as guides for the rods 39 (Figs. 9 and 10) and rests for the rods during the act of assembling the parts, but when the meter is once installed and in operation, the rods 39 will hang clear of the supports 91 and do not touch anything. To the latter end the rods 39 have flanges 92 which will be rested upon the supports to keep the restrictors 40 from dropping to the bottom of the compartments.

The restrictors 40 are for the purpose of insuring accuracy in the operation of the meter. There is a time in the operation of the meter when there would be a heavy flow of liquid out of the siphons 41 provided the path through the siphons was unrestricted. It is then desirable to restrict the flow in order to give the buckets 60 a chance to operate. If the heavy flow were permitted, the rate of discharge from the large siphon tubes would become so large that a considerable amount of water would be lost without first being registered. Under-registration would be the result. A heavy flow of water might almost fill a bucket 60 when a complete swing of the latter should be accomplished when it was only half full. The restrictors subdue the flow of water into the buckets so that the operation may be reduced to a normal rate.

The restrictor 40 (describing one of the two shown) is in the nature of a plug. The plug is made hollow so that its counter-balance weight can be made small and the meter correspondingly lighter. There is considerable clearance between the restrictor and the walls of the siphon tube 41 (Fig. 10). This clearance provides a space in which the liquid can flow out of the siphon into the bucket 60. The restrictor is of such a length that the restriction will be maintained for approximately three-fourths of the throw of the priming pan 21. The upper end of the restrictor is tapered at 93 and terminates in a pin 94, these parts being mainly for guidance.

Parts 95 (Fig. 10) constitute an arm carrying the restrictor 40 and a counter-balance 96. The arm 95 is sustained in a level position, insuring the reciprocation of the restrictor in the end of the siphon tube 41 without restriction. Each knife edge 71 of the restrictors has bearing at such a location with respect to the center of rotation that its horizontal displacement through its range of motion is at a minimum. This quality is necessary to avoid binding of the restrictors in the ends of the siphon tubes.

Reverting to the parts 48, it is observed in Figure 6 that there is an equalizer port 97 near the top. This port establishes liquid communication between the compartments 44 and 45. The lower edge of this port is shown at the elevation of the top inside part of the bends of the siphon tubes 41. But it should be understood that it may be further desirable to have the port considerably above the bends, the actual location depending upon the amount of water held in the priming pan and the degree of restriction of the compartment restrictors 43. There is no fixed location for the port 97.

In practice it has been found that an oily film of infinitesimal thickness will spread over the inside surface of the siphons, and if the meter remains out of operation for such a length of time that it dries out, the water stream will take an agitated twisted path when the meter is again started up, sometimes allowing air to enter the siphon outlet and work its way upward. This if permitted will break the siphon. In order to prevent this contingency, it is only necessary to lengthen the outer tubes 59 so that they extend well into the buckets 60 so that the outlets will still be submerged, forming a water seal, when the buckets are in the down position. However, there will be ample opportunity for the discharge of any air from the large siphon tubes before the water seal is made.

The small siphon tubes 61 merely need small cups 101 (Fig. 12) beneath the outlets 63. The outlets extend into the cups, and a water seal should be formed therein. Each cup has a minute orifice 102 through which the water will ultimately drain.

The operation is readily understood. The principle is to actuate the dial works and the hands 14 through the driver elements 80 and 81 (Fig. 6) by a rocking of the lever 74. It is from the ends of this lever that the buckets 60 are suspended, and as these buckets are alternately filled by the large siphons 41 and alternately emptied by the small siphons 61, there will result the rocking of the lever 74 because the weight is shifted from one side to the other.

The buckets 60 will hold a determined quantity of liquid, but it is not alone by the filling of the buckets that the measurement of the liquid occurs for it is by the filling of the buckets that the mechanism is actuated to perform all of the functions of measurement.

The buckets 60 overflow only after they have swung the rocker lever 74 (Fig. 5) and the large siphons 41 have been primed (Fig. 2). The reason for their overflow at that time is that the large siphons discharge directly into the buckets, and the small siphons 61 (Fig. 12) contained by the buckets not having nearly the capacity of the large siphons are unable to dispose of the water as fast as it is supplied by the large siphons. Hence the buckets 60 overflow soon after the large siphons 41 are completely primed. They continue to overflow until the large siphons "break", whereupon the small siphons 61 (Fig. 12) dispose of the water in the buckets down to the point of "breaking" of the small siphons. However, the buckets 60 do not overflow until after the rocker lever 74 has been completely thrown and the large siphon has been completely primed and begun to fill the respective buckets.

Refer to Figure 11. Liquid enters at the inlet 9. It flows into the nozzle 7 and out at the reduced end 18. The deflector 56 diverts any steam which escapes at the vent 15 (Fig. 2). The partition 31 determines that side of the priming pan 21 to which the liquid shall flow. The priming pan will not stand in the mid position in Figure 11 during the operation of the meter, but will rock first to one side then the other, it being recalled that the buckets 60 are connected with the priming pan through the medium of the shaft 22.

Liquid entering the priming pan will be discharged through the chutes 42 into the compartments 44 and 45. The discharge will be alternate because as the flow is passing from nozzle 7 through duct 36 and into compartment 44, the other compartment 45 (or vice versa) has either discharged or is discharging its contents out of the siphon tube 59. The weight of the water in the priming pan 21 takes no part in causing this element to rock.

The pan unbalance weights 29 are for the latter purpose. They are so set that when the pan is down on one side, the weight of the water in the opposite or high side will not be sufficient to throw the pan over until water has risen to a certain elevation in the companion bucket 60. The main function of the priming pan is to deflect the water to the proper compartment 44, 45. The only additional function of the priming pan is to hold sufficient water that on light load, when practically all of the flow through nozzle 7 is discharging at one of the siphons 59 as overflow into the respective bucket 60 and the water in the respective compartment is maintained at a low level, such water will be spilled out suddenly on the dump of the rocker element and will suddenly build up the water head to the level of the port 97 before the restrictor 40 has opened and permitted priming of the siphon.

Under similar conditions when operating under a heavy load, the liquid would probably already be overflowing the port 97, and when the contents of the priming pan 21 are suddenly dumped out, the water merely flows through the port 97 and levels off the same as under the light load. In either case, the water in the two compartments is leveled off through the port 97 at the time of priming of the siphons, and on light flows, the priming pan induces a surge of water in one of the compartments to build the water level up to the port 97 so that the priming of one of the siphons 59 will take place and the siphonic action started near the end of the water dump when the restrictor 40 opens.

It is the purpose of the restrictors 40 to prevent the priming of the siphons 41 until the restricted flow through one of the outer tubes 59 into the bucket 60 that happens to be elevated, has risen high enough to draw the rocker lever 74. The respective restrictor 40 will then depart from the end of the tube 59, but the restriction that it had afforded will not be relieved until it has accomplished approximately three-fourths of its travel. The respective bucket 60 is moving downward, and it is not until it reaches practically the end of its downward movement that priming of its companion siphon takes place.

Thus it is apparent that the purpose of each restrictor 40 is to limit the flow of water out of the respective tube 59 and into the companion bucket 60 until the latter has been weighted sufficiently to accomplish the dumping of the pan 21. Prior to this occasion, the water running through the tube 59 is only in the nature of a light overflow, the siphon operation not commencing until the pan has dumped. Upon dumping of the water into the companion compartment the level of the water will rise in that compartment, prime the siphon to complete discharge into the bucket and cause the latter to complete its rocking action of the priming pan.

Great importance is attached to the compartment restrictors 43. The use of these makes it possible to prime the siphons with a relatively small volume of water. They restrict the cross-sectional area of the compartment.

Were the restrictors 43 left out of the compartments 44, 45 (Fig. 9) it would take many times more water to prime the siphons 41 (Fig. 2) than with the restrictors in use. In either case a certain head of water is necessary to prime a siphon. Also, in either case this head of water represents the force that will not only crowd the siphon full of water to the level of the water in the compartment but will crowd it full of water to a level slightly below the level of the water in the compartment.

The distance that the siphon is full of water below the water level of the compartment represents the priming head, or in other words, that head which causes the siphon to fill itself full of water and discharge. In order to get this head without using the restrictors 43, it would be necessary to fill the entire compartment to the elevation of the restrictors, the amount of water required, being the product of the necessary priming head and the cross sectional area of the compartment, would be many times greater than the amount that would produce the same necessary priming head by cutting off most of the cross sectional area which occurs by the use of the restrictors 43.

Since volume is the product of cross sectional area and height, the volume change determined by the rise of water in the compartment a certain definite height with the restrictor in the compartment will be less than the volume change determined by the rise of the water in the compartment the same definite height without the restrictor in proportion to the degree of restriction.

On heavy load, when the water has risen to the overflowing point of port 97, it will occupy a higher elevation in the compartment from which it is spilling than it will on a light load because it will take a greater head on the orifice to give this greater flow.

This variation of the amount of water in the compartment at the time of dump, if there were no cross-section restrictor in the compartment would give an appreciable variation in accuracy from light to heavy load because the volume of variation would be the entire cross sectional area of the compartment multiplied by the head variation.

By restricting this cross section by use of this restrictor as much as possible which is determined by the necessary size of ducts 42, depression 49, and so forth, the same variation of head will take place over the entire compartment where there is any liquid, but the quantity of liquid increase by this increase of head will be decreased in the proportion of the cross sectional area restriction. Therefore it must be remembered that the compartment restrictor 43 does not cause any less head on the port 97 or in any way cut down on or change variations of head under varying loads on the orifice 97 and the liquid pressure at the extreme bottom of the compartments 44 and 45 would be the same under like conditions whether the restrictor 43 was in or not. But the control is in the volume as determined by the cross sectional area.

The inaccuracies are held to a minimum because these elevation variations occur only on a small cross sectional area instead of the entire compartment and hence a minimum volume variation.

Reverting to the siphons: The small siphon 61 does not discharge the contents of its bucket 60 and the water in the latter does not recede to the end 98 (Fig. 12) until the siphonic action of the large siphon 41 has finally ended at the inside lower end.

The large siphon 41 has a somewhat greater capacity than the small siphon throughout its entire range that although some water is continually running out of the small siphon as soon as the latter is primed, the larger part of the water continues to run over the sides of the bucket 60 until the large siphon breaks at the lower inside end as just stated. It is then that the small siphon evacuates the contents of the respective bucket 60 to the point 98, thus lightening that bucket in preparation for an operation of the opposite bucket when a dump occurs in respect thereto as in the manner just described.

Should it so happen that one of the compartments 44, 45 fills to an overflowing point at the port 97 (Fig. 6) the liquid will overflow into the next compartment for measurement in a succeeding operation. This provision avoids the slow running of the meter on heavy loads. The space in the compartments 44 and 45 below the ends of the siphon tubes 41 therein constitutes large settling basins where any dirt in the liquid can collect. The heavier sediment goes to the bottom, and any lighter substances will either remain in suspension below the breaking point of the large siphon tubes or pass off with the liquid during the siphoning action. The provision of the settling basins is another step toward the assurance of accuracy, the segregation of the dirt preventing over-registration.

As the buckets 60 reciprocate during the action of the meter the baffle plates 64 will strike the liquid in the cups 66. The purpose of this feature is to prevent any sound which might otherwise occur and to ease up on the dump. The forces involved in the action of the meter are very light, and no detrimental effect on the mechanism would be noticeable if the dashpots were not used. However, they do serve the purposes named, and for that reason they will be employed.

The accuracy of the meter, especially of the parts that enter in its operation, is a factor which is desired to be emphasized. The compartment restrictors 43 can be relied upon to damp out such inaccuracies as might arise from varying heads at the port 97. Again, the restrictors 40 can be relied upon to delay the priming of the siphons and the final surge of water until the proper time. This provision will avoid under-registration. The priming pan 21 is capable of containing only substantially equal volumes of water, there being but very little variation of the heads of water in the hoppers 19 and 20.

The foregoing damping out action occurs as follows: In case of a heavy load the water in the compartment 44 (for example) will rise to a little higher elevation than with a light load because to push this heavier flow over the port 97 (Fig. 9) requires this heavier head. The higher this head the greater the under-registration. Without the compartment restrictor (Figs. 9 and 11) this head will be the same as with it but the amount of water previously mentioned is the product of this head and the cross sectional area of the compartment 44.

Without the restrictors 43 this under-registration water would be the amount of water as determined by the product of this small head over the entire cross section of the compartment 44, but with the restrictor the amount of the under-registration water would be the product of the same small head of water but instead of being over the entire cross section of the compartment it would be only over the cross section not occupied by the restrictor.

Friction is cut down to the minimum by the various knife-edge bearings. Practically no shocks will occur in the oscillation of the rocker lever 74 and its parts and although the latter is designed to strike the stop screws 87 yet the impetus will be so light that there will be no indication of the screws flattening out. If the impacts were so great as to flatten out the screws after a period of use of the meter, false registration would be the result because the buckets would increase their downward travel as the period of use is prolonged and make under-registration, particularly on heavy loads, more conspicuous.

The provision of a water seal in the buckets 60 is also of importance to the operation of the meter. This prevents air from working up into the tubes 59 and breaking the streams after the siphons have been primed. As previously described, the result is accomplished by extending the outlets of the tubes 59 sufficiently far into the bucket 60 that when the latter are in the down position the ends of the tubes will still be submerged. It is recalled that the overflow starts when a particular bucket is in the up position. When the bucket dumps to the down position there will be a period of time before the water will rise to the bottom of the tube 59.

During this time priming of the siphon will take place and drive any air out of the tube 59. After the water rises above the end of the tube 59 the aforesaid seal will be made. It is thus that distortion of the water stream is avoided, as well as the consequent possibility of air being admitted to the tube 59 and the breaking of the siphonic stream. On a similar principle the small siphons 61 are provided with air seals which comprise a quantity of water in each of the cups 101. These have small holes 102 through which the water will finally drain after the siphon has operated.

I claim:—

1. A meter comprising a registering device, a compartment, a bucket, a rocker lever, means whereby the bucket is suspended from said rocker lever, a priming pan connected with the lever and adapted to discharge liquid into the compartment, said pan and lever being connected with the registering device for the operation thereof, means for periodically charging the pan with liquid so as to fill the compartment, and a siphon associated with the compartment and discharging into the bucket causing the lever and pan to rock.

2. A meter comprising a registering device, a connected rocker lever and priming pan joined with the registering device for its operation, a pair of compartments into which the priming pan alternately discharges a liquid, a pair of buckets, means by which each bucket is suspended from the rocker lever, means for periodically filling each of the buckets from its respective compartment, and means for emptying the buckets when filled to a determined point, said filling and emptying of the buckets setting up a rocking motion of the lever and of the priming pan for the ultimate purpose of actuating the registering device.

3. A meter having liquid inlet and outlet openings and comprising a registering device, a priming pan having a pair of ducts to be filled alternately from said inlet opening, a rocker lever with which the pan is connected for rocking, the pan and lever being joined with the registering device, compartments into which the ducts alternately discharge, buckets, means by which the buckets are suspended from the lever, a siphon in each compartment adapted to alternately discharge into the buckets, and siphons associated with the buckets for alternately discharging them for an escape of the liquid at said outlet opening, said alternate charging and discharging of the buckets setting up a rocking motion of the lever and pan for the ultimate operation of the registering device.

4. In a meter, a priming pan having a pair of alternately fillable ducts, a rocker lever separate from the priming pan, a pair of buckets, means by which the buckets are suspended from said lever, means for alternately filling and emptying the buckets thus to rock the lever, means by which the lever and pan are connected to rock as one, and a registering device with which said last named means is connected so that the rocking of the lever and pan can be transmitted to said device.

5. In a meter, a rocking lever having knife-edge seats, buckets having rods with knife-edges resting on the seats, means for alternately filling and emptying the buckets thus rocking the lever, a registering device, and means connecting the lever therewith thus to cause operation of said device upon said rocking of the lever.

6. In a meter, a priming pan having a partition and tops defining ducts, hoppers and discharge spouts, knife-edges along the axis of which the partition extends, bearings upon which the knife-edges rest, and balancing weights extending from the priming pan at opposite sides of the axis.

7. In a meter, a priming pan having a shaft with a boss and end hubs, knife-edges having means by which they are affixed to the hubs, bearings on which the knife-edges rest, stems extending from the boss, and weights applied to the stems to perform a certain balancing action when the priming pan rocks on its bearings.

8. In a meter, a compartment, a rockable priming pan for periodically charging the compartment with liquid, a restrictor fitted upon the compartment as a cover, and a chute in the restrictor communicating with the compartment and having an enlarged end into which the priming pan discharges.

9. In a meter, a compartment, a restrictor fitted in the compartment as a cover, a bracket carried by the restrictor, and a displacement plunger suspended from the restrictor into the compartment, having a stem adjustably carried by the bracket.

10. A meter comprising a registering device, a rocking lever connected with said device, a bucket, means by which the bucket is suspended from said lever, means for periodically filling the bucket causing a rocking of the lever in one direction by virtue of the weight, and a dashpot for checking the movement of the bucket by virtue of said weight.

11. A meter comprising a registering device, a rocking lever connected therewith, a bucket, means by which the bucket is suspended from the lever, means to charge the bucket with liquid causing it to move by virtue of the weight and thus rock the lever, a cup into which liquid is adapted to be discharged from the bucket, and a baffle plate carried by the bucket to strike the liquid and thus absorb the shock of movement.

12. A meter comprising a registering device, a rocking lever connected therewith, a bucket, means by which the bucket is suspended from the lever, a compartment, means by which the compartment is periodically charged with liquid, a siphon for periodically discharging the liquid from the compartment into the bucket causing movement of the bucket and rocking of the lever, a restrictor fitted in an end of the siphon for subduing the flow of liquid therefrom and preventing sudden surges, and means for actuating the restrictor by movement of the rocking lever.

13. A meter comprising a registering device, rocking means connected with said device, a bucket, means whereby the bucket is suspended from the rocking means, restrictor means, means whereby the restrictor means is suspended from said rocking means, a compartment, means by which the compartment is periodically charged with liquid, and a siphon tube fitted in a wall of the compartment into one end of which the restrictor means is movable simultaneously with the advance of the bucket over the other end thereof when said rocking means rocks in one direction.

14. In a meter, a liquid compartment, a siphon extending from the compartment for the discharge of the liquid, and a restrictor fitted in the compartment down over the siphon to reduce the amount of liquid necessary in the compartment to start a priming head in the siphon.

15. In a meter, a rockably mounted priming pan having a spout, a compartment to be filled with liquid from the pan, a restrictor fitted in the compartment, and a chute extending through the restrictor, having an enlarged end into which the spout discharges liquid during the rocking of the priming pan.

CHARLES HAROLD SPARKLIN.